(12) United States Patent
Payette et al.

(10) Patent No.: US 10,896,109 B2
(45) Date of Patent: *Jan. 19, 2021

(54) NON-MONOTONIC EVENTUAL CONVERGENCE FOR DESIRED STATE CONFIGURATION

(71) Applicant: MICROSOFT TECHNOLOGY LICENSING, LLC, Redmond, WA (US)

(72) Inventors: Bruce Gordon Payette, Bellevue, WA (US); Hemant Mahawar, Redmond, WA (US); Kenneth M. Hansen, Redmond, WA (US); Mark Gray, Woodinville, WA (US); Narayanan Lakshmanan, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/918,708

(22) Filed: Mar. 12, 2018

(65) Prior Publication Data

US 2018/0203776 A1    Jul. 19, 2018

Related U.S. Application Data

(63) Continuation of application No. 14/982,306, filed on Dec. 29, 2015, now Pat. No. 9,952,953.

(Continued)

(51) Int. Cl.
*G06F 11/22* (2006.01)
*G06F 8/656* (2018.01)
(Continued)

(52) U.S. Cl.
CPC ............ *G06F 11/2289* (2013.01); *G06F 8/31* (2013.01); *G06F 8/656* (2018.02); *G06F 8/71* (2013.01);
(Continued)

(58) Field of Classification Search
CPC .......... G06F 11/3051; G06F 8/31; G06F 8/71; G06F 9/44505; G06F 11/368; G06F 8/656; G06F 11/2289; G06F 11/3048
See application file for complete search history.

(56) References Cited

U.S. PATENT DOCUMENTS 6,289,510 B1    9/2001  Nakajima
6,487,713 B1   11/2002  Cohen
(Continued)

FOREIGN PATENT DOCUMENTS

CN    101697133 A    4/2010
CN    103186378 A    7/2013
(Continued)

OTHER PUBLICATIONS

Ravikanth Chaganti, "Windows PowerShell Desired State Configuration Revealed", chapter 3 "Introducing Desired State Configuration", published by Apress on Sep. 24, 2014, p. 77-90, (Year: 2014).*

(Continued)

*Primary Examiner* — S. Sough
*Assistant Examiner* — Zheng Wei
(74) *Attorney, Agent, or Firm* — Buckley, Maschoff & Talwalker LLC (57) ABSTRACT

Technologies are provided for non-monotonic eventual convergence for desired state configuration ("DSC"). In some situations DSC cannot move toward a desired state without first moving further from that state. For example, a file that needs to be replaced with a newer version but that is currently executing (desired state of "operating") cannot be replaced without first being stopped. But stopping moves in the wrong direction relative to the desired state, which is to have the service operating. This moving away so as to be able to move forward is a problem for conventional DSC (Continued)

200 systems that results in failures. The solution to this problem is non-monotonic eventual convergence ("NMEC") which enables a DSC system to configure a target system for a desired state by moving further away from a desired state if that is needed to eventually reach the desired state.

20 Claims, 6 Drawing Sheets

Related U.S. Application Data (60) Provisional application No. 62/249,928, filed on Nov. 2, 2015.

(51) Int. Cl.
| | |
|---|---|
| *G06F 8/30* | (2018.01) |
| *G06F 8/71* | (2018.01) |
| *G06F 9/445* | (2018.01) |
| *G06F 11/30* | (2006.01) |
| *G06F 11/36* | (2006.01) |

(52) U.S. Cl.
CPC ...... *G06F 9/44505* (2013.01); *G06F 11/3048* (2013.01); *G06F 11/3051* (2013.01); *G06F 11/368* (2013.01)

(56) References Cited

U.S. PATENT DOCUMENTS

| | | | |
|---|---|---|---|
| 6,785,706 B1 | 8/2004 | Horman | |
| 7,401,127 B2 | 7/2008 | Tsuda | |
| 7,669,177 B2 | 2/2010 | Gerber | |
| 7,836,428 B2 | 11/2010 | Mitchell | |
| 7,970,746 B2 | 6/2011 | Seshadri | |
| 8,219,794 B1 | 7/2012 | Wang | |
| 8,336,027 B2 | 12/2012 | Aitken | |
| 8,504,982 B2 | 8/2013 | Joe | |
| 8,677,343 B2* | 3/2014 | Averbuch | G06F 8/654 |
| | | | 717/171 |
| 8,701,128 B2 | 4/2014 | Salt | |
| 8,856,862 B2 | 10/2014 | Dimitrakos | |
| 9,052,891 B2 | 6/2015 | Eo | |
| 9,128,803 B2 | 9/2015 | Shukla | |
| 9,588,756 B2 | 3/2017 | Liem | |
| 2003/0217358 A1* | 11/2003 | Thurston | G06F 8/60 |
| | | | 717/174 |
| 2004/0210890 A1 | 10/2004 | Armstrong | |
| 2005/0035970 A1 | 2/2005 | Wirtschafter | |
| 2005/0055692 A1 | 3/2005 | Lupini | |
| 2005/0091269 A1 | 4/2005 | Gerber | |
| 2005/0203958 A1 | 9/2005 | Mitchell | |
| 2006/0236316 A1 | 10/2006 | McDowell | |
| 2006/0248112 A1 | 11/2006 | Williams | |
| 2007/0168960 A1 | 7/2007 | Carey | |
| 2008/0016504 A1 | 1/2008 | Cheng | |
| 2008/0184217 A1 | 7/2008 | Kai | |
| 2009/0228878 A1 | 9/2009 | Katsaros | |
| 2011/0214113 A1 | 9/2011 | You | |
| 2012/0066484 A1 | 3/2012 | Yin | |
| 2012/0072893 A1* | 3/2012 | Gupta | G06F 8/65 |
| | | | 717/168 |
| 2012/0102364 A1 | 4/2012 | Kemmler | |
| 2012/0210312 A1 | 8/2012 | Ma | |
| 2012/0331447 A1 | 12/2012 | Nayak | |
| 2013/0063445 A1 | 3/2013 | Blanco | |
| 2013/0174137 A1 | 7/2013 | Kim | |
| 2014/0068597 A1* | 3/2014 | Hirahara | G06F 8/65 |
| | | | 717/173 |
| 2014/0075032 A1 | 3/2014 | Vasudevan | |
| 2014/0157249 A1 | 6/2014 | Perez Diez | |
| 2014/0237465 A1* | 8/2014 | Lin | H04L 67/1063 |
| | | | 717/173 |
| 2014/0344780 A1 | 11/2014 | Eo | |
| 2014/0359258 A1 | 12/2014 | Snover | |
| 2015/0058831 A1* | 2/2015 | Warren | G06F 8/41 |
| | | | 717/140 |
| 2015/0227358 A1* | 8/2015 | Lavoie | G06F 8/654 |
| | | | 717/173 |
| 2015/0317150 A1 | 11/2015 | Suwabe | |
| 2016/0132299 A1 | 5/2016 | Harrison | |
| 2016/0188319 A1 | 6/2016 | Groover | |
| 2016/0203313 A1 | 7/2016 | El-Moussa | |
| 2016/0246582 A1 | 8/2016 | Benton | |
| 2017/0147331 A1 | 5/2017 | Li Em | |

FOREIGN PATENT DOCUMENTS

| | | |
|---|---|---|
| CN | 103491189 A | 1/2014 |
| EP | 2 738 673 A1 | 6/2014 |

OTHER PUBLICATIONS

J.W. Lloyd, "Practical Advantages of Declarative Programming", published by Joint Conference on Declarative Programming, GULP-PRODE'94, pp. 1-15 (Year: 1994).*
"International Preliminary Report on Patentability Issued in PCT Application No. PCT/US2016/058837", dated Jan. 18, 2018, 11 pages.
"Second Written Opinion Issued in PCT Application No. PCT/US2016/058837", dated Oct. 5, 2017, 10 Pages.
European Patent Office, Officer Cristinel Gafita, PCT International Search Report and Written Opinion for Application No. PCT/US2016/058837, dated Jan. 31, 2017,12 pages, Rijswijk, Netherlands.
"PowerShell DSC—struggling with intermediate desired state", 4 pages, Sep. 16, 2014.
Quick, "Configuration Management with Windows PowerShell Desired State Configuration (DSC)", 25 pages, Accepted: Aug. 15, 2015.
Modi, "Windows PowerShell—Authoring Desired State Configuration Custom Resources", msdn magazine, vol. 30 No. 4, 17 pages, Apr. 2015.
Willmann, "Enabling Pluggable, Cloud-Scale Heterogeneous Hardware Management with a High-Level Management Infrastructure", Vmware Technical Journal, Summer 2014.
Mar-Elia, "An In-Depth Walkthrough of Desired State Configuration in PowerShell Windows Management Framework v4", Group Policy Blog, Jul. 9, 2013.
Bustamante, "Hosting WCF Services", Code Magazine, Dec. 18, 2014.
Cover, ed., "Standards for Automated Resource Management in the Computing Environment", Cover Pages, Hosted by Oasis, Aug. 31, 2006.
Gilda, "Configure the webservices Subsystem", US/JBoss Enterprise Application Platform 6, Development Guide, Section 12.2., Red Hat, Inc., Copyright © 2012, retrieved Aug. 19, 2015.
"Office Action Issued in European Patent Application No. 16794827.2", dated Jan. 10, 2020, 4 Pages.
"First Office Action and Search Report Issued in Chinese Patent Application No. 201680063792.4", dated Aug. 20, 2020, 14 Pages.

* cited by examiner

FIG. 6

NON-MONOTONIC EVENTUAL CONVERGENCE FOR DESIRED STATE CONFIGURATION

RELATED APPLICATIONS

This Application is a Continuation of and claims benefit from or priority of U.S. patent application Ser. No. 14/982,306 that was filed Dec. 29, 2015 and has issued as U.S. Pat. No. 9,952,953, and claims benefit from or priority of U.S. Provisional Patent Application No. 62/249,928 filed Nov. 2, 2015, each of which is incorporated herein by reference in its entirety.

BACKGROUND

Computing and networking resources have essentially reached utility status—that is, the Internet along with wireless and wired networks have made network-based computing services accessible, inexpensive, and ubiquitous. Virtual machine technologies have made it possible to simplify massive cloud computing installations. And desired state configuration ("DSC") systems has made it relatively easy to configure and manage massive numbers of computing devices such as deployed in cloud computing and similar installations. Even so, DSC is relatively new and is impaired by various shortcomings that result in the need for manual intervention—a significant problem in massive deployments.

SUMMARY

The summary provided in this section summarizes one or more partial or complete example embodiments of the invention in order to provide a basic high-level understanding to the reader. This summary is not an extensive description of the invention and it may not identify key elements or aspects of the invention, or delineate the scope of the invention. Its sole purpose is to present various aspects of the invention in a simplified form as a prelude to the detailed description provided below.

The invention encompasses technologies providing non-monotonic eventual convergence for desired state configuration. One class of problem in DSC is that, in some situations, DSC cannot move forward toward a desired state without first moving further from the desired state. For example, an executable file providing a service that needs to be replaced with a newer version, but that is currently executing (i.e., in the desired state of "operating"), cannot be replaced with the newer version without first being stopped. But stopping the service moves in the wrong direction relative to the desired state, which is to have the service operating. This moving away from the desired state so as to be able to move closer to the desired state is a problem for conventional DSC systems that results in failures. The solution to this problem is herein referred to as "non-monotonic eventual convergence" or "NMEC". Such NMEC enables a DSC system to configure a target system for a desired state by moving further away from that state if such is needed to eventually reach the desired state.

DESCRIPTION OF THE DRAWINGS

The detailed description provided below will be better understood when considered in connection with the accompanying drawings, where.

DETAILED DESCRIPTION

The detailed description provided in this section, in connection with the accompanying drawings, describes one or more partial or complete example embodiments of the technologies, but is not intended to describe all possible embodiments of the technologies. This detailed description sets forth various examples of at least some of the systems and/or methods of the technologies. However, the same or equivalent technologies, systems, and/or methods may be realized according to examples as well.

Computing Environments

Although the examples provided herein are described and illustrated as being implementable in a computing environment, the environment described is provided only as an example and not a limitation. As those skilled in the art will appreciate, the examples disclosed are suitable for implementation in a wide variety of different computing environments.

Figure 1:
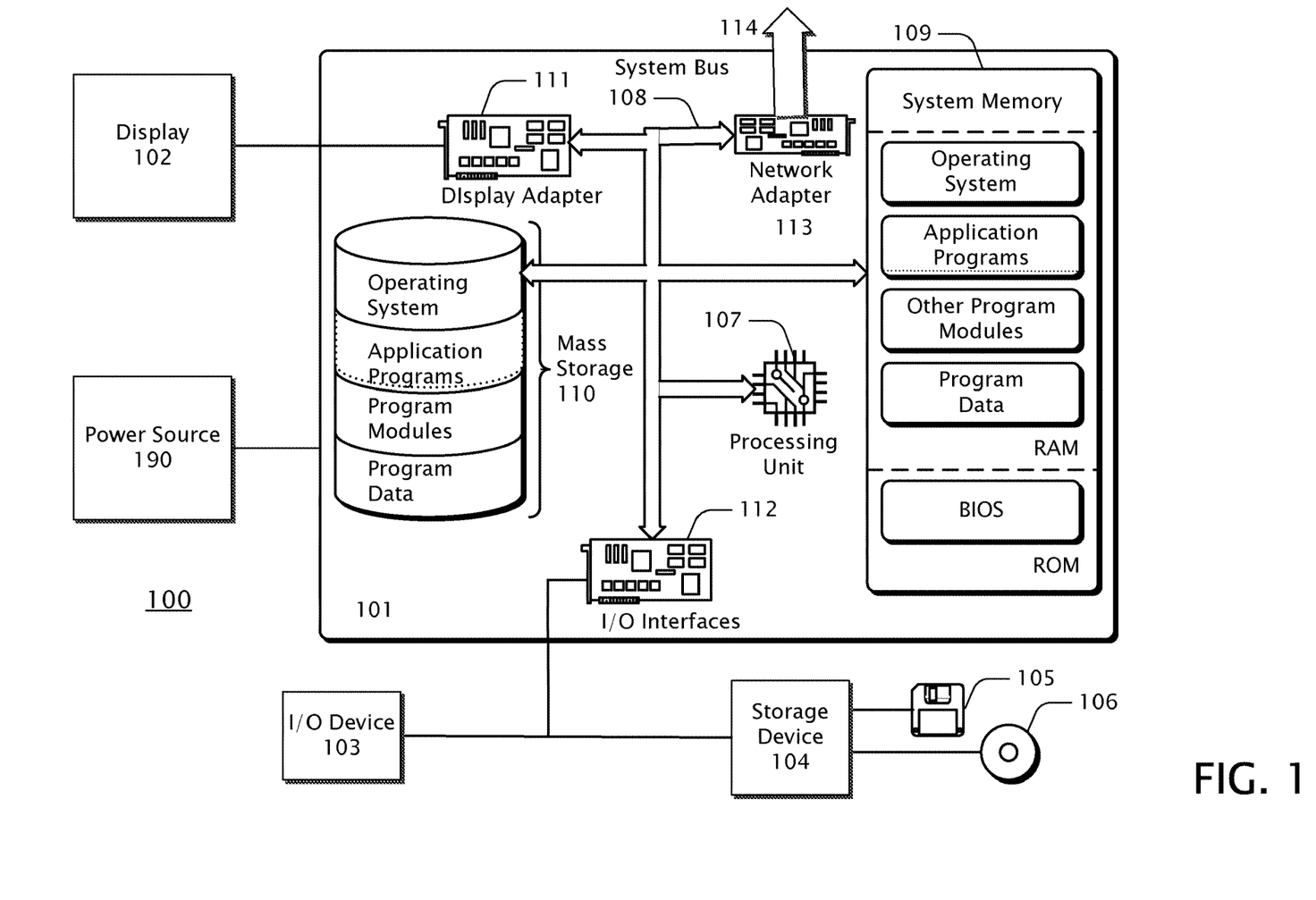
FIG. 1 is a block diagram showing an example computing environment 100 in which the invention described herein may be implemented.

FIG. 1 is a block diagram showing an example computing environment 100 in which the invention described herein may be implemented. A suitable computing environment may be implemented with numerous general purpose or special purpose systems. Examples of such systems include, but are not limited to, cell phones, personal digital assistants ("PDA"), personal computers ("PC"), hand-held or laptop devices, microprocessor-based systems, multiprocessor systems, systems on a chip ("SOC"), servers, Internet services, workstations, consumer electronic devices, cell phones, set-top boxes, and the like. In all cases, such systems are strictly limited to articles of manufacture and the like.

Computing environment 100 typically includes a general-purpose computing system in the form of a computing device 101 coupled to various components, such as peripheral devices 102, 103, 101 and the like. These may include components such as input devices 103, including voice recognition technologies, touch pads, buttons, keyboards and/or pointing devices, such as a mouse or trackball, that may operate via one or more input/output ("I/O") interfaces 112. The components of computing device 101 may include one or more processors (including central processing units ("CPU"), graphics processing units ("GPU"), microprocessors ("μP"), and the like) 107, system memory 109, and a system bus 108 that typically couples the various components. Processor(s) 107 typically processes or executes various computer-executable instructions and, based on those instructions, controls the operation of computing device 101. This may include the computing device 101 communicating with other electronic and/or computing devices, systems or environments (not shown) via various communications technologies such as a network connection 114 or the like. System bus 108 represents any number of bus structures, including a memory bus or memory controller, a peripheral bus, a serial bus, an accelerated graphics port, a processor or local bus using any of a variety of bus architectures, and the like.

System memory 109 may include computer-readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 109 typically stores data, computer-executable instructions and/or program modules comprising computer-executable instructions that are immediately accessible to and/or presently operated on by one or more of the processors 107.

Mass storage devices 104 and 110 may be coupled to computing device 101 or incorporated into computing device 101 via coupling to the system bus. Such mass storage devices 104 and 110 may include non-volatile RAM, a magnetic disk drive which reads from and/or writes to a removable, non-volatile magnetic disk (e.g., a "floppy disk") 105, and/or an optical disk drive that reads from and/or writes to a non-volatile optical disk such as a CD ROM, DVD ROM 106. Alternatively, a mass storage device, such as hard disk 110, may include non-removable storage medium. Other mass storage devices may include memory cards, memory sticks, flash drives, hybrid storage devices, tape storage devices, and the like.

Any number of computer programs, files, data structures, and the like may be stored in mass storage 110, other storage devices 104, 105, 106 and system memory 109 (typically limited by available space) including, by way of example and not limitation, operating systems, application programs, data files, directory structures, computer-executable instructions, and the like.

Output components or devices, such as display device 102, may be coupled to computing device 101, typically via an interface such as a display adapter 111. Output device 102 may be a liquid crystal display ("LCD"). Other example output devices may include printers, audio outputs, voice outputs, cathode ray tube ("CRT") displays, tactile devices or other sensory output mechanisms, or the like. Output devices may enable computing device 101 to interact with human operators or other machines, systems, computing environments, or the like. A user may interface with computing environment 100 via any number of different I/O devices 103 such as a touch pad, buttons, keyboard, mouse, joystick, game pad, data port, and the like. These and other I/O devices may be coupled to processor 107 via I/O interfaces 112 which may be coupled to system bus 108, and/or may be coupled by other interfaces and bus structures, such as a parallel port, game port, universal serial bus ("USB"), fire wire, infrared ("IR") port, and the like.

Computing device 101 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 101 may be coupled to a network via network adapter 113 or the like, or, alternatively, via a modem, digital subscriber line ("DSL") link, integrated services digital network ("ISDN") link, Internet link, wireless link, or the like.

Communications connection 114, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 190, such as a battery or a power supply, typically provides power for portions or all of computing environment 100. In the case of the computing environment 100 being a mobile device or portable device or the like, power source 190 may be a battery. Alternatively, in the case computing environment 100 is a desktop computer or server or the like, power source 190 may be a power supply designed to connect to an alternating current ("AC") source, such as via a wall outlet.

Some mobile devices may not include many of the components described in connection with FIG. 1. For example, an electronic badge may be comprised of a coil of wire along with a simple processing unit 107 or the like, the coil configured to act as power source 190 when in proximity to a card reader device or the like. Such a coil may also be configure to act as an antenna coupled to the processing unit 107 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 102, I/O device 103, or many of the other components described in connection with FIG. 1. Other mobile devices that may not include many of the components described in connection with FIG. 1, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, program modules, or the like maintained in an electronic memory such as a ROM that is embedded in an electronic device. The term "software" generally refers to computer-executable instructions, code, data, applications, programs, program modules, or the like that are maintained in or on any form or type of computer-readable media that is configured for storing computer-executable instructions or the like in a manner that is accessible to a computing device. The term "computer-readable media" and the like as used herein is strictly limited to referring to one or more hardware apparatus, hardware article of manufacture, or the like physical hardware that is statutory in nature and that is not a signal or carrier wave per se. The term "computing device" as used in the claims refers to one or more physical hardware devices such as example computing device 101 and encompasses client devices, mobile devices, one or more servers, network services such as an Internet service or corporate network service, and the like, and any combination of such.

Declarative Vs Imperative Programming Models

Imperative programming models require programmers to define a sequence of specific commands that a program is to perform to achieve a desired result. In contrast, declarative programming models allow programmers to define an end result that a program is to achieve without describing specific actions the program is to take in order to achieve the result. That is, a declarative program describes a desired result without explicitly listing steps to be performed to achieve that desired result.

One application for declarative programming models is desired state configuration ("DSC"). For example, when performing repetitive tasks, such as configuring a large number of servers and/or other machines such as in a distributed or cloud-computing environment, it is helpful to automate the configuration tasks. When using imperative programming models (e.g., scripting languages) for such configuration automation, all of the specific steps needed to accomplish a configuration task must be individually included in a configuration program. Steps must be included for each different scenario that may be encountered to ensure that the configuration task will be properly performed. As a result, using imperative programming models for developing configuration programs can be quite tedious and expensive because the programmer must include steps for every possible error condition and exception that could occur. Using DSC (based on declarative programming models) can make the development of such configuration programs much simpler and less expensive than when using imperative programming models such as scripting languages and the like.

Desired State Configuration Graph

Figure 2:
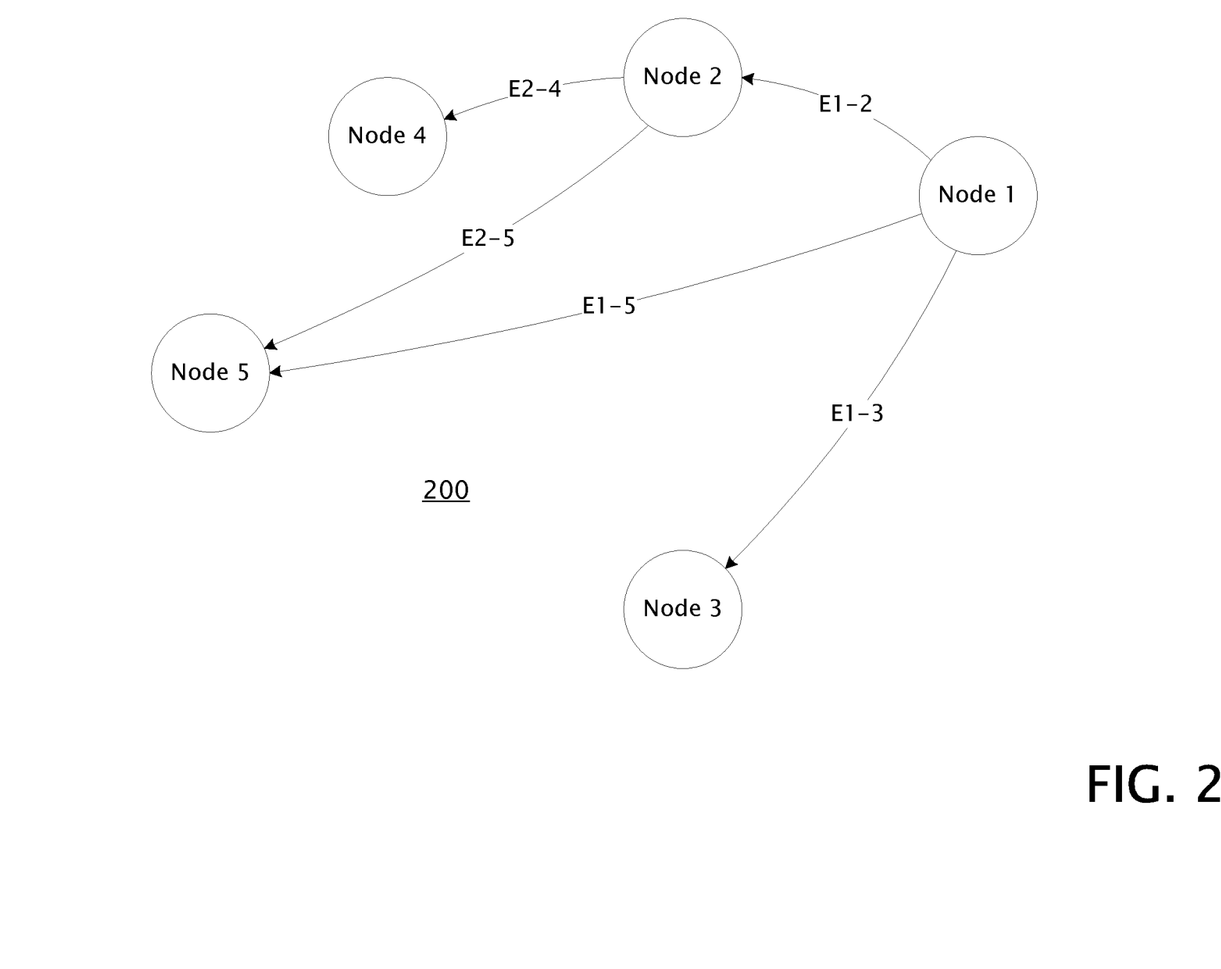
FIG. 2 is a diagram showing an example desired state configuration graph 200.

FIG. 2 is a diagram showing an example desired state configuration graph 200. The phrase "desired state configuration" ("DSC") as used herein refers to declarative configuration of resources according to a specified desired state. The phrase "declarative configuration" as used herein refers to configuration based on one or more declarative programming models as opposed to imperative programming models. The phrase "imperative programming" generally refers to models of programming based on specifying steps to be performed in order to achieve a desired state or end result without specifying the desired state—that is, specifying the "how" without specifying the "what". Various models for imperative programming are embodied in the form of various programming languages, often referred to as procedural programming languages. These typically include scripting languages, object-oriented languages, and other procedural languages such as C #, C++, C, Basic, various assembly languages, and many more. The phrase "declarative programming" generally refers to models of programming based on specifying a desired state or end result without specifying the steps to be performed in order to achieve the desired state—that is, specifying the "what" without specifying the "how". One such model of declarative programming referred to herein is desired state configuration ("DSC"), a declarative programming model directed to the configuration of resources according to a specified desired state. The term "resource" as used herein refers to any entity that can be configured. Non-limiting examples of such entities include hardware (computers, computing devices, and the like), software (programs, virtual machines, and the like), and any combination of the foregoing (computing systems, services, and the like). The terms "resource" and "object" may also refer to a representation of a resource as defined in the preceding sentence, such as a representation provided in a configuration file or a management object format ("MOF") file or the like, such as described below.

Returning to FIG. 2, DSC graph 200 includes several example nodes that are variously connected via several example edges. In this example, Node 1 represents a desired state of some resource. Edges E1-2, E1-3, and E1-5 each represent a "depends on" relationship between Node 1 and Nodes 2, 3, and 5 respectively. That is, the desired state for Node 1 depends on the states of Nodes 2, 3, and 5. In general, a DSC graph will be acyclic. Further, the depends-on relationships typically represent directional relationships between the nodes. In graph 200, these directional depends-on relationships are indicated by the arrow heads on the edges. In this example, the arrows leaving a dependent node point to the node(s) depended upon. Thus, a DSC graph is generally a directed, acyclic graph. Note that the direction of the arrows is simply a matter of description that is not limiting upon the inventive subject matter.

As illustrated by Nodes 1 and 2, DSC nodes can depend on more than one other node. Indeed a DSC node can depend on any number of other nodes, even zero other nodes as in the case of Nodes 3, 4, and 5. Further, any node can be depended on by one or more other nodes. And the final node, Node 1 in this example, has no other nodes depending on it, the only such node in a single DSC graph.

Desired State Configuration Methods

Figure 3:
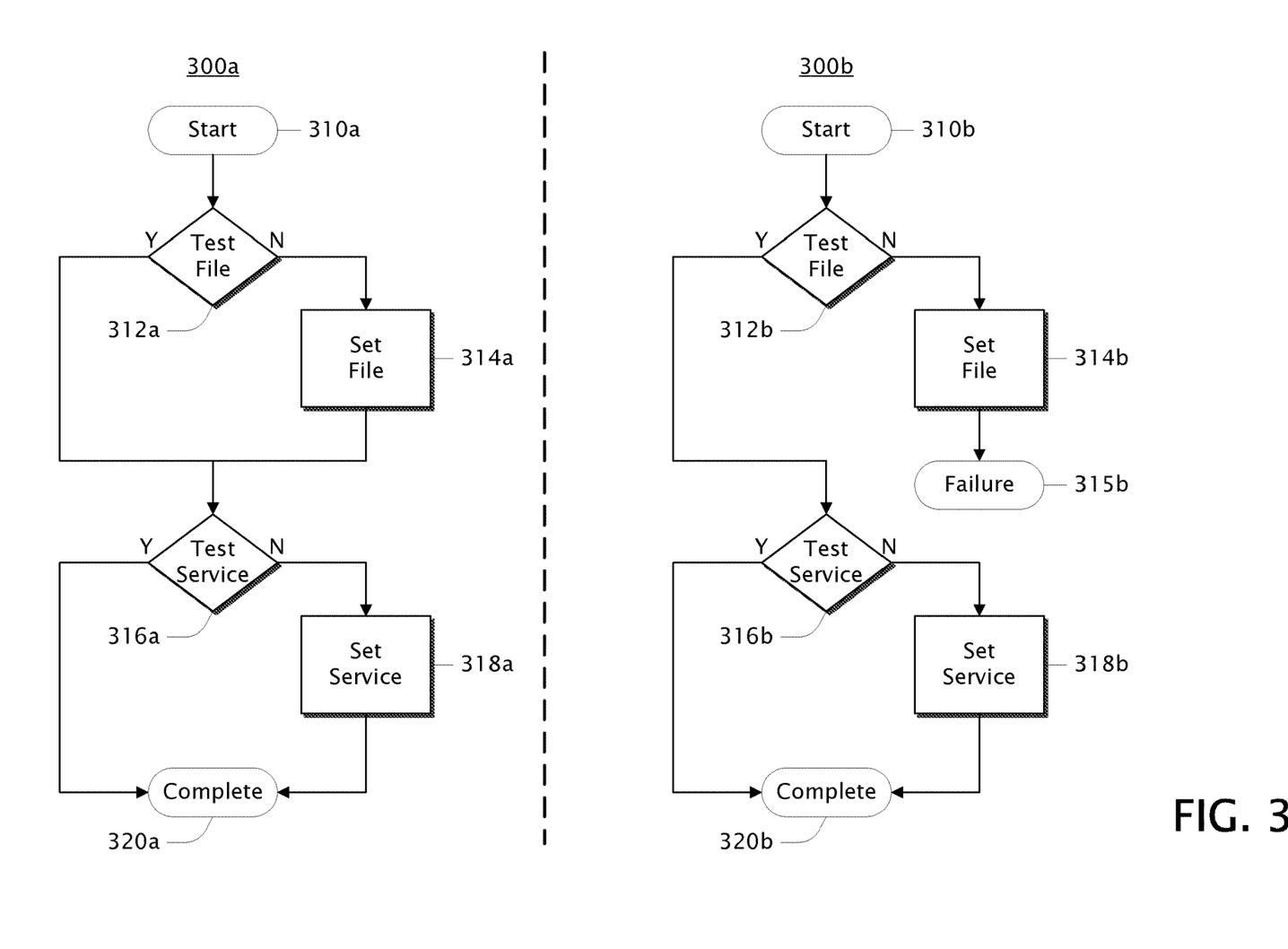
FIG. 3 is a diagram showing example methods of desired state configuration.

FIG. 3 is a diagram showing example methods of desired state configuration. Method 300a is an example method for initially configuring a desired state of a service, e.g., providing Service1 as an operating service, which is accomplished via execution of a particular file, say a file named service1.dll. In an example DSC system seeking to enact a desired state in which the service Service1 Is operating, method 300a typically begins (310a) by testing whether or not the file required for the service Service1 is installed and properly configured (312a), such as via a DSC Test File operation or the like. If, as determined by the DSC Test File operation, the needed file is already installed and properly configured, then method 300a typically continues at block 316a. If not (which may be the case when initially configuring the desired state of the service), the needed file is installed and/or configured according to a DSC Set File operation or the like (314a). In one example, the foregoing steps of method 300a may be attributed to a particular node in a DSC graph or the like, such as example Node 2 of graph 200 in FIG. 2 on which Node 1 depends. In this example, Node 2 represents a desired state in which a particular file is installed and properly configured, I.e., the file services1.dll. The foregoing steps are intended to configure that desired state. In general, any steps required to configure the desired state are taken by method 300a or the like. Once the file service1.dll is configured in the desired state, then method 300a typically continues at block 316a.

Next, once the file services1.dll is configured in the desired state, method 300a typically continues by testing whether or not the service Service1 is in the desired state, e.g., operating (316a). If so, as determined via a DSC Test Service operation or the like, then method 300a is typically complete (320a). If not, then (which may be the case when initially configuring the desired state of the service), the service Service1 is started according to a DSC Set Service operation or the like (318a). Once the service Service1 is configured in the desired state, then method 300a is typically complete (320a). In one example, the foregoing steps 316a and 318a of method 300a may be attributed to a particular node in a DSC graph or the like, such as example Node 1 of graph 200 in FIG. 2 which depends on Node 2 in this particular example.

Method 300b of FIG. 3 is an example method for configuring a desired state of a service, e.g., providing Service1 as an operating service, as in method 300a, except that in this example Service1 was previously configured. Method 300b is essentially the same as method 300a except that, because the example service was previously configured, a particular type of failure can occur.

To explain this example, consider a scenario in which the desired state is for the service Service1 to be operational, but it is a new version of the service Service1 that is desired relative to the previous version for which the desired state was already enacted, such as via method 300a. That new version is provided in this example by a new version of the file service1.dll. Information identifying the new version of the file and various dependencies and related information are added to the DSC system, such as by updating various properties of DSC objects or the like.

Figure 4:
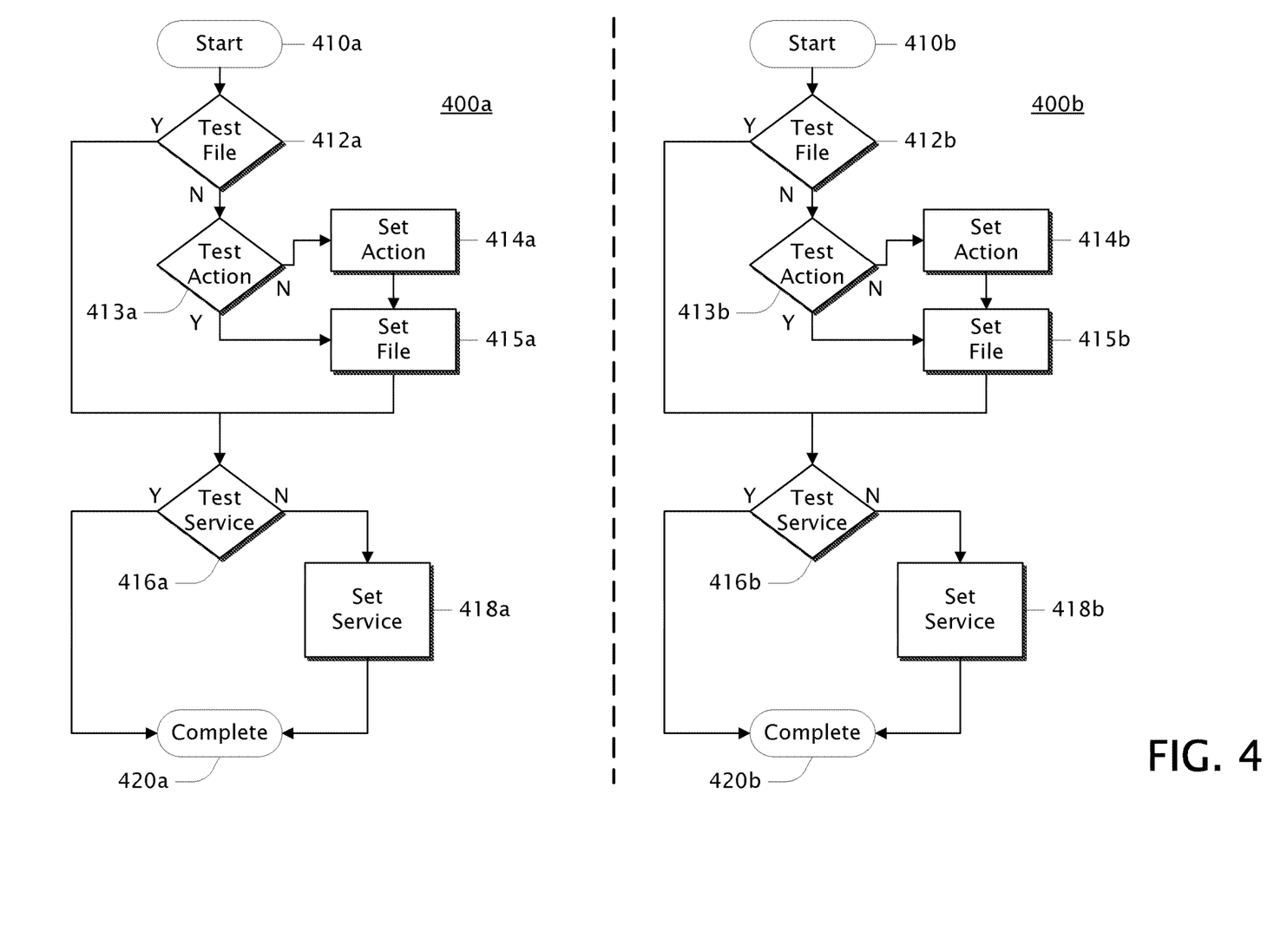
FIG. 4 is a diagram showing example methods of enhanced desired state configuration that resolve problems of the type described in connection with FIG. 3.

Once the DSC system is updated to include information describing the new version of service Service1 along with all dependencies (such as information regarding the new version of the file service1.dll), when configuration of the desired state is again requested method 300b will determine at step 312b, such as via the DSC Test File operation, that the currently installed version of the file service1.dll is incorrect. As a result, method 300b will continue at block 314b where the example DSC Set File operation will attempt to install the correct version of the file. But, in various target systems, because the currently installed version of the file is currently executing due to the service Service1 previously being configured as operating, the attempt to replace (e.g., overwrite or delete) the existing file will fail, leading to failure 315b of the DSC system's effort to enact the desired state of the new version of the service Service1. A solution to this problem is illustrated in FIG. 4. The term "target system" as used herein refers to some system for which configuration of a desired state is sought.

Enhanced Desired State Configuration Methods

FIG. 4 is a diagram showing example methods of enhanced desired state configuration that resolve problems of the type described in connection with FIG. 3. That is, problems where a DSC system cannot move forward to achieve a desired state without first moving further from the desired state so as to be able to move forward toward the desired state. For example, considering the problem described in relation to FIG. 3, the file service1.dll could not be replaced with the newer version without first stopping the service Service1 so that the file could be replaced. But stopping the service moves in the wrong direction relative to the desired state, which is to have the service operating. This moving away from the desired state so as to be able to move closer to the desired state is herein referred to as "non-monotonic eventual convergence" or "NMEC". Such NMEC enables a DSC system to configure a target system for a desired state by moving further away from that state if such is needed to eventually reach the desired state.

Method 400a is an example method for initially configuring a desired state of a service, e.g., providing Service1 as an operating service, which is accomplished via execution of a particular file, say a file named service1.dll. In an example DSC system seeking to enact a desired state in which the service Service1 Is operating, method 400a typically begins (410a) by testing whether or not the file required for the service Service1 is installed and properly configured (412a), such as via a DSC Test File operation or the like. If, as determined by the DSC Test File operation, the needed file is already installed and properly configured, then method 400a typically continues at block 416a. If not (which may be the case when initially configuring the desired state of the service), then method 400a typically continues at block 413a At block 413a, method 400a is enhanced over methods 300a and 300b with a DSC Test Action operation or the like. At block 413a, which was arrived at because the file service1.dll is an incorrect version, the state of Service1 is checks to see if it in a non-operational state (e.g., stopped)—i.e., a state in which the file can be replaced, but also a state that is further away from the desired final state, which is for the service Service1 to be operating. If the service Service1 is non-operational, such as determined by the DSC Test Action operation, the method 400a typically continues at block 415a. Otherwise, a desired temporary state of the service Service1 is enacted at block 414a, such as by a DSC Set Action operation or the like (another enhancement over methods 300a and 300b), e.g., such as by configuring the service Service1 to a non-operational state (e.g., stopped). Once the service Service1 is configured in the desired temporary state, method 400b typically continues at block 415a. In one example, the foregoing steps of method 400a may be attributed to a particular node in a DSC graph or the like, such as example Node 2 of graph 200 in FIG. 2 on which Node 1 depends. In this example, Node 2 represents a desired state in which a particular file is installed and properly configured, I.e., the file services1.dll. The foregoing steps are intended to enact that desired state. In general, any steps required to enact the desired state are taken by method 400a or the like. Once the file service1.dll is configured in the desired state, then method 400a typically continues at block 416a.

Next, once the file services1.dll is configured in the desired state, method 400a typically continues by testing whether or not the service Service1 is in the desired state, e.g., operating (416a). If so, as determined via a DSC Test Service operation or the like, then method 400a is typically complete (420a). If not, then (which may be the case when configuring the desired state for a new version of the service), the service Service1 is started according to a DSC Set Service operation or the like (418a). Once the service Service1 is configured in the desired state, then method 400a is typically complete (420a). In one example, the foregoing steps 416a and 418a of method 400a may be attributed to a particular node in a DSC graph or the like, such as example Node 1 of graph 200 in FIG. 2 which depends on Node 2 in this particular example.

Method 400b operates essentially the same as method 400a and does not suffer from the failure condition described in connection with method 300b. Methods 400a and 400b provide enhancements over methods 300a and 300b via the DSC Test Action and DSC Set Action operations that provide for non-monotonic eventual convergence by the DSC system.

Configuration and MOF Files

Following is example declarative code that defines a DSC configuration—Configuration Service1—that largely corresponds to the examples of the methods described in connection with FIG. 3.

```
########Begin StandardBehavior.ps1 example ####################

# Define a named configuration, in this case 'Service1"

Configuration Service1
{
   Import-DscResource -ModuleName 'PSDesiredStateConfiguration'
   Declare a file must exist and be the same as a source file
   File Service1D11
   {
      Ensure         = 'Present'
      Type           = 'File'
      SourcePath     = '\\RepoServer\Repo\service1.d11'
      DestinationPath = 'C:\Program Files\MyCompany\MyProduct\service1.d11'
      MatchSource    = $true
   }
   #Declare a service must be running
   Service Service1
   {
      Ensure         = 'Present'
      State          = 'Running'
      Name           = 'Service1'
      StartupType    = 'Automatic'
      Path           = 'C:\Program Files\MyCompany\MyProduct\service1.exe'
      BuiltInAccount = 'Local System'
      DisplayName    = 'My Cool Service'
      Description    = 'This service allows your system to do cool stuff'
      DependsOn      = '[File]Servce1D11'
   }
}
Service1 -OutputPath C:\Examples_Priv\NodeConfigs\IntermediateState\
######End StandardBehavior.ps1 example ##########################
```

In one example, such a DSC configuration in such a declarative code format as shown above is converted into management object format ("MOF") file content. An example of such MOF file content that corresponds to the above DSC configuration is show below.

```
/*
@TargetNode = 'localhost'
@GeneratedBy = brucepay
@GenerationDate = 10/16/2015 14:59:39
@GenerationHost = BRUCEPAYPRO3
*/
instance of MSFT_FileDirectoryConfiguration as $MSFT_FileDirectoryConfiguration1ref
{
ResourceID = "[File]Service1D11";
SourcePath = "\\RepoServer\\Repo\\service1.d11";
DestinationPath = "C:\\Program Files\\MyCompany\\MyProduct\\service1.d11";
ModuleName = "PSDesiredStateConfiguration";
SourceInfo = "C:\\Users\\brucepay\\documents\\dsc\\ExistingBehavior.ps1::10::5::File";
ModuleVersion = "1.0";
ConfigurationName = "Service1";
};
instance of MSFT_ServiceResource as $MSFT_ServiceResource1ref
{
   SourceInfo = "C:\\Users\\brucepay\\docoments\\dsc\\ExistingBehavior.ps1::17::5::Log";
   ModuleName = "PSDesiredStateConfiguration";
   ResourceID = "[Service]Service1";
   BuiltInAccount = 'LocalSystem'
   Description = 'This service allows your system to do cool stuff'
   DisplayName = 'My Cool Service'
   Ensure = 'Present'
   Name = 'Service1'
   Path = 'C:\\Program Files\\MyCompany\\MyProduct\\service1.exe'
   State = 'Running'
   StartupType = 'Automatic'
   DependsOn = {"[File]Service1D11"};
   ModuleVersion = "1.0";
   ConfigurationName = "Service1";
};
instance of OMI_ConfigurationDocument
{
   Version ="2.0.0";
   MinimumCompatibleVersion = "1.0.0";
   CompatibleVersionAdditionalProperties = {"Omi_BaseResource:ConfigurationName"};
```

```
  Author ="markgray";
  GenerationDate ="10/16/2015 14:59:39";
  GenerationHost ="MCG-LENOVO";
Name ="Service1";
};
```

In one example, a DSC system, such as via a DSC engine, applies the DSC configuration declared in the MOF file to a target system resulting in the target system being configured to the desired state.

Enhanced Configuration and MOF Files

Following is example enhanced declarative code that that defines a DSC configuration—Configuration Service1—that largely corresponds to the examples of the methods described in connection with FIG. 4.

```
########Begin EnhancedBehavior.ps1 example ####################

# Define a named configuration, in this case 'Service1"

Configuration Service1
{
  Import-DscResource -ModuleName 'PSDesiredStateConriguration'
  #Declare a file must exist and be the same as a source file
  File Service1D11
  {
    Ensure        = 'Present'
    Type          = 'File'
    SourcePath    = '\\RepoServer\Repo\service1.d11'
    DestinationPath = 'C:\Program Files\MyCompany\MyProduct\service1.d11'
    MatchSource   = $true
  }
  #Declare an action to take before running set on file
  Service ServiceAction1
  {
    Ensure        = 'Present'
    State         = 'Stopped'
    Name          = 'Service1'
    BetoreSet     = '[File]Service1D11'
  }
  #Declare a service must be running
  Service Service1
  {
    Ensure        = 'Present'
    State         = 'Running'
    Name          = 'Service1'
    StartupType   = 'Automatic'
    Path          = 'C:\Program Files\MyCompany\MyProduct\service1.exe'
    BuiltInAccount = 'LocalSystem'
    DisplayName   = 'My Cool Service'
    Description   = 'This service allows your system to do cool stuff'
    DependsOn     = '[File]Service1D11'
  }
}
MyService -OutputPath C:\Examples_Priv\NodeConfigs\IntermediateState\
######End EnhancedBehavior.ps1 example ############################
```

Note the declared action "ServiceAction1" in the enhanced declarative code above that corresponds to the example DSC Test Action described in connection with FIG. 4. In that example, the BeforeSet property in the ServiceAction1 declaration indicates that, before the DSC Set File operation of block 415*a*, the temporary desired state declared by the ServiceAction1 declaration must be enacted. Only after that temporary desired state is enacted, such as via the DSC Set Action operation (414*a*), is the DSC Set File operation (415*a*) performed. Such enhancements providing for non-monotonic eventual convergence by the DSC system eliminates the failure condition described in connection with method 300*b*.

In one example, such an enhanced DSC configuration in such an enhanced declarative code format as shown above is converted into management object format ("MOF") file content. An example of such enhanced MOF file content that corresponds to the above enhanced DSC configuration is show below.

the desired state of the resource is set), a potentially divergent state (specified by the action's State property) for that resource must first be enacted.

Desired State Configuration System

Figure 5:
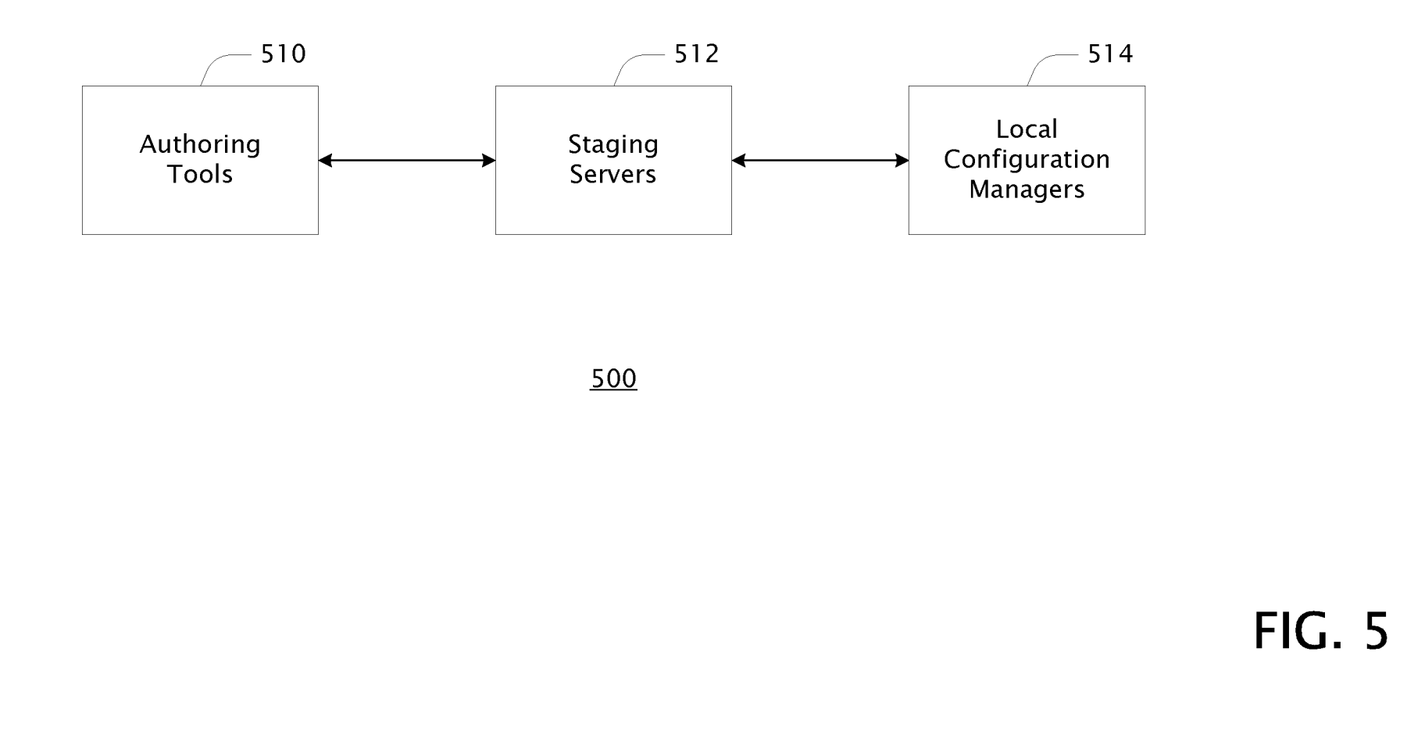
FIG. 5 is a block diagram showing an example desired state configuration ("DSC") system 500 configured for implementing aspects of the instant invention.

FIG. 5 is a block diagram showing an example desired state configuration ("DSC") system 500 configured for

```
/*
@TargetNode = 'localhost'
@GeneratedBy = brucepay
@GenerationDate = 10/16/2015 14:59:39
@GenerationHost = BRUCEPAYPRO3
*/
instance of MSFT_FileDirectoryConfiguration as $MSFT_FileDirectoryConfiguration1ref
{
ResourceID =" [File] Service1D11";
SourcePath = "\\RepoServer\\Repo\\service1.d11";
DestinationPath = "C:\\Program Files\\MyCompany\\MyProduct\\service.d11";
ModuleName = "PSDesiredStateConfiguration";
SourceInfo = "C:\\Users\\brucepay\\documents\\dsc\\NewBehavior.ps1::10::5::File";
ModuleVersion = "1.0";
ConfigurationName = "Service1";
};
instance of MSFT_ServiceResource as $MSFT__ServiceResource1ref
{
   SourceInfo = "C:\\Users\\brucepay\\documents\\dsc\\NewBehavior.ps1::17::5::Log";
   ModuleName = "PSDesdredStateConfiguration";
   ResourceID = "[Service]ServiceAction1";
   Ensure = 'Present'
   Name = 'Service1'
   State = 'Stopped'
   BeforeSet = {"[File]Service1D11"};
   ModuleVersion = "1.0";
   ConfigurationName = "Service1";
};
instance of MSFT_ServiceResource as $MSFT_ServiceResource2ref
{
   SourceInfo ="C:\\Users\\brucepay\\documents\\dsc\\NewBehavior.ps1::17::5::Log";
   ModuleName = "PSDesiredStateConfiguration";
   ResourceID = "[Service]Service1";
   BuiltInAcount = 'LocalSystem'
   Description = 'This service allows your system to do cool stuff'
   DisplayName = 'My CoolService'
   Ensure = 'Present'
   Name = 'Service1'
   Path = 'C:\\Program Files\\MyCompany\\MyProduct\\service1.exe'
   State = 'Running'
   StartupType = 'Automatic'
   DependsOn = {"[File]Servcie1D11"};
   ModuleVersion = "1.0";
   ConfigurationName = "Service1";
};
instance of OMI_ConfigurationDocument
{
   Version ="2.0.0";
   MinimumCompatibleVersion = "1.0.0";
   CompatibleVersionAdditionalProperties = {"Omi_BaseResource:ConfigurationName"};
   Author ="markgray";
   GenerationDate ="10/16/2015 14:59:39";
   GenerationHost="MCG-LENOVO";
   Name="Service1";
};
```

Note $MSFT_ServiceResource1ref with the BeforeSet property in the MOF file content shown above that corresponds to the declared action "ServiceAction1" with its BeforeSet property in the enhanced declarative code above. Note that in other examples, the BeforeSet property may be known by any name other than BeforeSet, such as WaitFor or any other name. Regardless of the name of the property, its function is typically to at least in part support and/or provide for the non-monotonic eventual convergence described herein so as to reduce and/or eliminate the failure condition and the like described in connection with method 300b. In general, the BeforeSet property of a declared action indicates that, before a desired state for a resource (specified by the action's BeforeSet property) is enacted (i.e., before implementing aspects of the instant invention. DSC system 500 typically includes several components including authoring tools 510, staging servers 512, and local configuration managers ("LCMs") 514. Each of these components (including any sub-components) may be implemented as a system comprising a hardware logic device (e.g., an integrated circuit or a device comprising such circuits), a computing device(s) (such as described in connection with FIG. 1 or the like) that, based on execution of particular instructions, isconfigured to perform the requisite method(s), a service comprising a set of devices (including one or more of the computing devices such as described in connection with FIG. 1 or the like), or as some combination of the foregoing.

Each such component may be implemented on/by one device, such as a hardware logic device or computing device, or across multiple such devices. For example, a component may be implemented in a distributed fashion on/by multiple devices such as, for example, servers or elements of a network service or web site or the like. Further, each such component (including any sub-components) may encompass one or more sub-components or the like, and the components may be implemented as separate components, or any two or more may be combined in whole or in part. The division of components described herein is non-limiting except where indicated, and is intended primarily to aid in describing aspects of the invention.

An authoring tool 510 enables the creation of DSC configurations, including those described above. Such tools typically provide for compiling DSC configurations resulting in compiled DSC configurations such as the MOF files described above. Such authoring tools 510 may be substantially similar to pre-existing components of conventional DSC systems with the exception that they are enhanced to support the enhanced declarative code and the like described above. This enhanced support is at least with respect to the editing and compiling of DSC configurations, along with any other enhanced functionality beneficial to supporting the enhanced declarative code and the like.

A staging server 512 provides for the staging of compiled DSC configurations such as MOF files where the staged files are typically made available via push or pull distribution models to target systems. Such staging servers 512 may be substantially similar to pre-existing components of conventional DSC systems with the exception that they may be enhanced to support the enhanced declarative code and the like described above.

A local configuration manager ("LCM") 514 is the DSC engine that runs on a target system and is responsible for parsing and enacting configurations that are provided to the target system. Each LCM is also responsible for a number of other aspects of DSC, including determining its target system's refresh mode (i.e., push or pull of MOFs or the like), specifying how often the target system obtains and enacts configurations, and associating the target system with staging servers.

Such LCMs 514 may be substantially similar to pre-existing components of conventional DSC systems with the exception that they are enhanced to support the enhanced declarative code and the like described above. This enhanced support is at least with respect to the parsing and enacting of DSC configurations, along with any other enhanced functionality beneficial to supporting the enhanced declarative code and the like. Such LCMs 514 are described further in connection with FIG. 6.

Local Configuration Manager Engine

Figure 6:
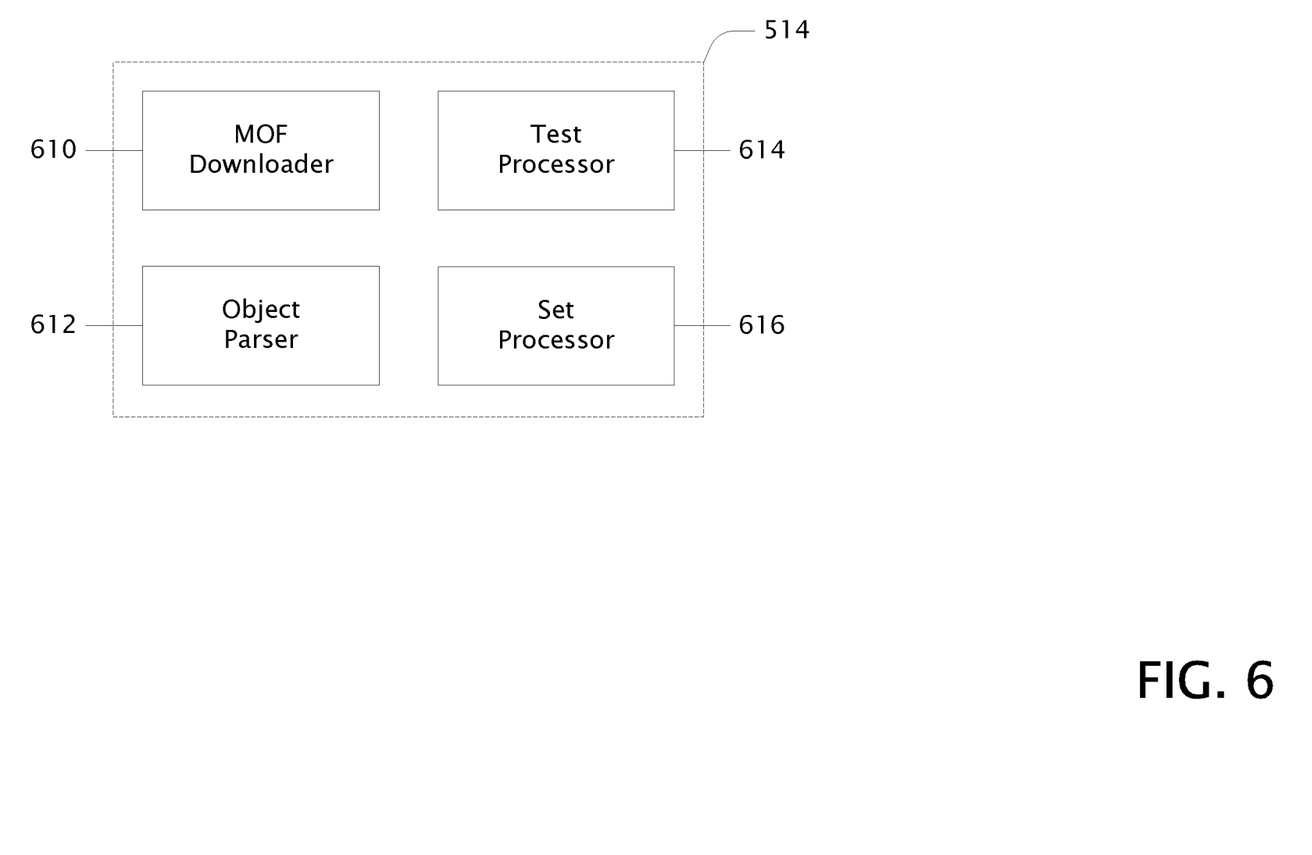
FIG. 6 is a block diagram showing an example local configuration manager ("LCM") 514 of desired state configuration ("DSC") system 500.

FIG. 6 is a block diagram showing an example local configuration manager ("LCM") 514 of desired state configuration ("DSC") system 500. LCM 514 typically includes several components including MOF downloader 610, object parser 612, test processor 614, and set processor 616. Each of these components (including any sub-components) may be implemented as a system comprising a hardware logic device (e.g., an integrated circuit or a device comprising such circuits), a computing device(s) (such as described in connection with FIG. 1 or the like) that, based on execution of particular instructions, is configured to perform the requisite method(s), a service comprising a set of devices (including one or more of the computing devices such as described in connection with FIG. 1 or the like), or as some combination of the foregoing. Each such component may be implemented on/by one device, such as a hardware logic device or computing device, or across multiple such devices. For example, a component may be implemented in a distributed fashion on/by multiple devices such as, for example, servers or elements of a network service or web site or the like. Further, each such component (including any sub-components) may encompass one or more sub-components or the like, and the components may be implemented as separate components, or any two or more may be combined in whole or in part. The division of components described herein is non-limiting except where indicated, and is intended primarily to aid in describing aspects of the invention.

MOF downloader 610 is a receiver configured for downloading MOF files or the like, such as those described above, from a staging server or the like, such as staging server 512. MOF downloader 610 may receive unsolicited MOF files provided (pushed) to the target system by a staging server or the like. Alternatively or additionally, MOF downloader 610 may request any available (e.g., new or updated) MOF file(s) from a staging server(s) or the like and then receive the available requested MOF file(s). MOF downloader 610 typically provides received MOF files to object parser 612.

Object parser 612 is a parsing engine configured for parsing objects and other MOF file content in the downloaded MOF files and the like. In particular, object parser 612 is unique from similar conventional object parsers in that it is enhanced to support the compiled enhanced declarative code and the like described above including the BeforeSet property and compiled references to declared actions, such as example ServiceAction1 described above.

Test processor 614 is a test processing engine configured for performing DSC Test operations, including those described in connections with FIGS. 3 and 4. In particular, test processor 614 is unique from similar conventional test processors in that it is enhanced to support the compiled enhanced declarative code and the like described above including the BeforeSet property and DSC Test Action operations, such as those described in connection with FIG. 4.

Set processor 616 is a set processing engine configured for enacting DSC Set operations, including those described in connections with FIGS. 3 and 4. In particular, set processor 616 is unique from similar conventional set processors in that it is enhanced to support the compiled enhanced declarative code and the like described above including DSC Set Action operations, such as those described in connection with FIG. 4.

Conclusion

In a first example, a method is performed on a computing device that includes at least one processor and memory, the method for providing non-monotonic eventual convergence in a desired state configuration ("DSC") environment, the method comprising: determining, by a DSC engine operating on the computing device, that a resource required for a target desired state of the computing device needs to be replaced; determining, via a DSC Test Action operation of the DSC engine, that the resource is in a state consistent with the target desired state, but that it cannot be replaced due to being in the state; configuring, via a DSC Set Action operation of the DSC engine, the resource in a temporary state that is further than the state from the target desired state, where the resource in the temporary state is able to be replaced; replacing, by the DSC engine subsequent to the configuring, the resource that is in the temporary state; and setting, by the DSC engine, the state of the replaced resource consistent with the target desired state.

In a second example, there is a computing device comprising: at least one processor; memory coupled to the at least one processor; a desired state configuration ("DSC") engine via which the computing device provides for non-monotonic eventual convergence in a DSC environment and via which the computing device determines that a resource required for a target desired state of the computing device needs to be replaced; a DSC Test Action operation of the DSC engine via which the computing device determines that the resource is in a state consistent with the target desired state, but that it cannot be replaced due to being in the state; a DSC Set Action operation of the DSC engine via which the computing device configures the resource in a temporary state that is further than the state from the target desired state, where the resource in the temporary state is able to be replaced; the DSC engine via which the computing device replaces the resource that is in the temporary state; and the DSC engine via which the computing device sets the state of the replaced resource consistent with the target desired state.

In a third example, there is at least one computer-readable medium that comprises computer-executable instructions that, based on execution by a computing device, configure the computing device to perform actions for providing non-monotonic eventual convergence in a desired state configuration ("DSC") environment, the actions comprising: determining, by a DSC engine operating on the computing device, that a resource required for a target desired state of the computing device needs to be replaced; determining, via a DSC Test Action operation of the DSC engine, that the resource is in a state consistent with the target desired state, but that it cannot be replaced due to being in the state; configuring, via a DSC Set Action operation of the DSC engine, the resource in a temporary state that is further than the state from the target desired state, where the resource in the temporary state is able to be replaced; replacing, by the DSC engine subsequent to the configuring, the resource that is in the temporary state; and setting, by the DSC engine, the state of the replaced resource consistent with the target desired state.

In the first, second, and third examples, the resource is an executable file; and/or it is determined via the DSC Test Action that the resource cannot be replaced in response to the DSC engine evaluating a BeforeSet property; and/or the BeforeSet property is a property of an action object declared in a configuration file; and/or the BeforeSet property is a property of a compiled resource in a compiled version of the configuration file, where the compiled resource corresponds to the declared action object; and/or the state is an operational state; and/or the temporary state in a non-operational state.

Given the detailed description provided above, and in connection with the many possible embodiments to which the invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method performed on a computing device that includes at least one processor and memory, the method for providing non-monotonic eventual convergence in a desired state configuration ("DSC") environment, where the DSC environment operates using a declarative code according to a declarative programming model directed to configuration of a resource based on a target desired state as opposed to an imperative programming model to define commands to achieve the target desired state, the method comprising:
   determining, by the computing device, the target desired state of a service declared in the declarative code;
   determining, by the computing device, the configuration to replace the resource required for the target desired state of the service;
   in response to the determination to replace the resource required for the target desired state of the service, and before enacting the target desired state, providing the non-monotonic eventual convergence to execute a first declarative action declared in the declarative code to enact a divergent state of the service which is further away from the target desired state than a current state of the service;
   replacing the resource required for the target desired state while the service is in the divergent state; and
   after replacing the resource required for the target desired state of the service, executing a second declarative action declared in the declarative code to enact the target desired state of the service.

2. The method of claim 1 where the resource is an executable file.

3. The method of claim 1 where the determining of the target desired state is in response to a BeforeSet property indicating that the divergent state is to be established before the target desired state can be enacted.

4. The method of claim 3 where an action object comprises the BeforeSet property.

5. The method of claim 4 where a compiled version of a configuration file comprises the BeforeSet property.

6. The method of claim 1 where the target desired state is an operational state of the resource.

7. The method of claim 1 where the divergent state is a non-operational state of the resource.

8. A computing device comprising:
   at least one processor and memory that is coupled to the at least one processor and that includes computer-executable instructions that, based on execution by the at least one processor, configure the computing device to perform actions for providing non-monotonic eventual convergence in a desired state configuration ("DSC") environment, where the DSC environment operates using a declarative code according to a declarative programming model directed to configuration of a resource based on a target desired state as opposed to an imperative programming model to define commands to achieve the target desired state, the actions comprising:
   determining, by the computing device, the target desired state of a service declared In the declarative code;
   determining, by the computing device, the configuration to replace the resource required for the target desired state of the service;
   in response to the determination to replace the resource required for the target desired state of the service, and before enacting the target desired state, providing the non-monotonic eventual convergence to execute a first declarative action declared In the declarative code to enact a divergent state of the service which is further away from the target desired state than a current state of the service;
   replacing the resource required for the target desired state while the service is in the divergent state; and
   after replacing the resource required for the target desired state of the service, executing a second declarative action declared In the declarative code to enact the target desired state of the service.

9. The computing device of claim 8 where the resource is an executable file.

10. The computing device of claim 8 where the determining gf the target desired state is in response to a BeforeSet property indicating that the divergent state is to be established before the target desired state is enacted.

11. The computing device of claim 10 where an action object comprises the BeforeSet property.

12. The computing device of claim 11 where a compiled version of a configuration file comprises the BeforeSet property.

13. The computing device of claim 8 where the target desired state is an operational state of the resource.

14. The computing device of claim 8 where the divergent state is a non-operational state of the resource.

15. At least one computer-readable medium that comprises computer-executable instructions that, based on execution by a computing device, configure the computing device to perform actions for providing non-monotonic eventual convergence in a desired state configuration ("DSC") environment, where the DSC environment operates using a declarative code according to a declarative programming model directed to configuration of a resource based on a target desired state as opposed to an imperative programming model to define commands to achieve the target desired state, the actions comprising:

determining, by the computing device, the target desired state of a service declared In the declarative code;

determining, by the computing device, the configuration to replace the resource required for the target desired state of the service;

in response to the determination to replace the resource required for the target desired state of the service, and before enacting the target desired state, providing the non-monotonic eventual convergence to execute a first declarative action declared In the declarative code to enact a divergent state of the service which is further away from the target desired state than a current state of the service;

replacing the resource required for the target desired state while the service is in the divergent state; and after replacing the resource required for the target desired state of the service, executing a second declarative action declared In the declarative code to enact the target desired state of the service.

16. The at least one computer-readable medium of claim 15 where the determining of the target desired state is in response to a BeforeSet property indicating that the divergent state is to be established before the target desired state is enacted.

17. The at least one computer-readable medium of claim 16 where an action object comprises the BeforeSet property.

18. The at least one computer-readable medium of claim 17 where a compiled version of a configuration file comprises the BeforeSet property.

19. The at least one computer-readable medium of claim 15 where the target desired state is an operational state of the resource.

20. The at least one computer-readable medium of claim 15 where the divergent state is a non-operational state of the resource.

* * * * *